(12) United States Patent
Makarskyy et al.

(10) Patent No.: US 11,818,277 B1
(45) Date of Patent: Nov. 14, 2023

(54) COMPUTING SYSTEM FOR ELECTRONIC MESSAGE TAMPER-PROOFING

(71) Applicant: Allscripts Software, LLC, Raleigh, NC (US)

(72) Inventors: Stanislav Makarskyy, Arlington Heights, IL (US); Sayee Balaji Chandrasekaran, Raleigh, NC (US); Ram Pratapa, Austin, TX (US); Gaurav Samudra, Raleigh, NC (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 0 days.

(21) Appl. No.: 17/978,136

(22) Filed: Oct. 31, 2022

Related U.S. Application Data (63) Continuation of application No. 16/509,608, filed on Jul. 12, 2019, now Pat. No. 11,489,675.

(51) Int. Cl.
 *H04L 9/32* (2006.01)
 *H04L 9/40* (2022.01)

(52) U.S. Cl.
 CPC .......... *H04L 9/3247* (2013.01); *H04L 63/061* (2013.01)

(58) Field of Classification Search
 USPC ......................................................... 713/171
 See application file for complete search history.

(56) References Cited

U.S. PATENT DOCUMENTS

| | | | |
|---|---|---|---|
| 6,002,769 A | 12/1999 | McGough | |
| 6,353,891 B1 * | 3/2002 | Borella | H04L 63/0823 726/1 |
| 7,181,017 B1 * | 2/2007 | Nagel | H04L 9/0841 380/282 |
| 7,395,436 B1 | 7/2008 | Nemovicher | |
| 7,640,427 B2 | 12/2009 | Callas et al. | |
| 8,341,715 B2 * | 12/2012 | Sherkin | G06F 21/6218 713/168 |

(Continued)

OTHER PUBLICATIONS

"Office Action for U.S. Appl. No. 16/509,608", dated Nov. 22, 2021, 20 pages.

(Continued)

*Primary Examiner* — Amare F Tabor
*Assistant Examiner* — Mahabub S Ahmed
(74) *Attorney, Agent, or Firm* — Calfee, Halter & Griswold LLP (57) ABSTRACT

A computing system for generating tamper-proof electronic messages is disclosed herein. A service provider application receives an electronic message from a client application. The electronic message comprises an authorization provider (AuP) token that includes a public key of a local signing authority (LSA) and a signed payload that has been signed by the LSA using a private key of the LSA that forms a cryptographic key pair with the public key, the signed payload comprising an indication of a programmatic task to be executed by the service provider application. Responsive to validating the AuP token in the electronic message, the service provider application extracts the public key from the electronic message. Responsive to validating the signed payload based upon the extracted public key of the LSA, the service provider application executes the programmatic task.

20 Claims, 8 Drawing Sheets

(56) References Cited

U.S. PATENT DOCUMENTS

| | | | |
|---|---|---|---|
| 8,443,193 B1* | 5/2013 | Dreymann | H04L 9/3239 |
| | | | 713/168 |
| 8,468,351 B2* | 6/2013 | Boesgaard | G06F 21/606 |
| | | | 713/168 |
| 8,931,077 B2 | 1/2015 | Hrabik et al. | |
| 9,853,977 B1* | 12/2017 | Laucius | H04L 63/0815 |
| 9,894,067 B1* | 2/2018 | Mandadi | H04L 63/20 |
| 9,900,160 B1* | 2/2018 | Barbour | H04L 63/126 |
| 10,673,617 B1* | 6/2020 | Antoniou | G06F 13/4282 |
| 10,673,862 B1* | 6/2020 | Threlkeld | G06F 21/62 |
| 10,805,087 B1* | 10/2020 | Allen | G06F 21/57 |
| 10,862,883 B1* | 12/2020 | Bhattacharyya | H04L 63/0807 |
| 11,489,675 B1 | 11/2022 | Makarskyy et al. | |
| 2002/0007453 A1 | 1/2002 | Nemovicher | |
| 2002/0103811 A1* | 8/2002 | Fankhauser | G16H 40/67 |
| 2006/0031352 A1 | 2/2006 | Marston et al. | |
| 2007/0279227 A1* | 12/2007 | Juels | H04L 9/0861 |
| | | | 340/572.1 |
| 2009/0006851 A1* | 1/2009 | Freeman | H04L 63/126 |
| | | | 713/170 |
| 2010/0223342 A1 | 9/2010 | Brown et al. | |
| 2014/0006781 A1* | 1/2014 | Corella | H04L 9/3213 |
| | | | 713/168 |
| 2015/0074764 A1* | 3/2015 | Stern | H04L 9/3247 |
| | | | 726/4 |
| 2015/0163065 A1* | 6/2015 | Pan | H04L 9/3247 |
| | | | 713/176 |
| 2015/0318986 A1* | 11/2015 | Novak | H04L 9/0894 |
| | | | 713/189 |
| 2015/0339664 A1* | 11/2015 | Wong | G06Q 20/4015 |
| | | | 705/71 |
| 2016/0142409 A1* | 5/2016 | Frei | G06F 21/33 |
| | | | 713/176 |
| 2016/0269393 A1* | 9/2016 | Corella | G06F 21/32 |
| 2016/0352524 A1* | 12/2016 | Kinney | H04L 9/3247 |
| 2017/0201380 A1* | 7/2017 | Schaap | H04L 63/083 |
| 2017/0346807 A1* | 11/2017 | Blasi | H04L 63/0807 |
| 2019/0058591 A1* | 2/2019 | Sharpe | H04L 9/3234 |
| 2019/0124070 A1* | 4/2019 | Engan | H04L 9/3247 |
| 2019/0333056 A1* | 10/2019 | Wilkinson | H04L 9/50 |
| 2019/0342085 A1* | 11/2019 | Kube | H04L 9/3239 |
| 2020/0067907 A1* | 2/2020 | Avetisov | H04L 9/3234 |
| 2020/0259652 A1* | 8/2020 | Schmaltz, III | H04L 9/30 |
| 2020/0280449 A1* | 9/2020 | Shankar | H04L 9/3247 |
| 2020/0336481 A1* | 10/2020 | Fan | H04L 9/0643 |
| 2020/0366754 A1* | 11/2020 | Wang | H04L 67/60 |
| 2020/0374129 A1* | 11/2020 | Dilles | H04L 9/3247 |
| 2021/0044976 A1* | 2/2021 | Avetisov | H04L 63/0815 |
| 2021/0152365 A1* | 5/2021 | Nosseir | H04L 9/3239 |
| 2021/0243040 A1* | 8/2021 | Lu | H04L 9/0643 |
| 2021/0271743 A1* | 9/2021 | Jung | H04W 12/043 |
| 2021/0328811 A1* | 10/2021 | Engan | H04L 9/3213 |

OTHER PUBLICATIONS

"Response to the Office Action for U.S. Appl. No. 16/509,608", filed Apr. 22, 2022, 15 pages.

"Notice of Allowance and Fees Due for U.S. Appl. No. 16/509,608", dated Jun. 24, 2022, 10 pages.

* cited by examiner

COMPUTING SYSTEM FOR ELECTRONIC MESSAGE TAMPER-PROOFING

RELATED APPLICATION

This application is a continuation of U.S. patent application Ser. No. 16/509,608, filed on Jul. 12, 2019, and entitled "COMPUTING SYSTEM FOR ELECTRONIC MESSAGE TAMPER-PROOFING". The entirety of this application is incorporated herein by reference.

BACKGROUND

Tamper-proofing electronic messages is an important part of electronic communication. Tamper-proofing techniques include techniques directed towards providing channel security (e.g., Transport Layer Security (TLS)) and techniques directed towards electronic message security (e.g., messaging signing, message encryption, etc.).

An electronic message that is to be transmitted securely between computing devices often comprises a message header and a payload. The message header comprises a security token (e.g., an authorization provider (AuP) token), while the payload comprises an indication of a programmatic task that is to be performed by a computing device that receives the electronic message. Conventionally, there is no direct correlation between the security token and the payload, which can potentially leave the electronic message vulnerable to tampering. For instance, if a malicious actor obtained access to the security token, the malicious actor can potentially modify the payload of the electronic message to include an indication of a different programmatic task, which is a security risk.

In a common scenario, a computing system comprises a client application operated by a user, a service provider application that is to perform a programmatic task requested by the user, and a common security subsystem that generates security tokens. In the computing system, the service provider application is tasked with ensuring that the payload of the electronic message was in fact generated by the client application (and has not been modified by an outside actor), which is a challenging problem, especially in healthcare-related contexts where protected health information (PHI) of patients is potentially at risk for exposure.

Several conventional approaches exist that address the above-referenced problem. In a single-use token approach, the client application requests a single-use token from the common security subsystem for each electronic message sent by the client application to the service provider application. The client application then transmits the single-use token to the service provider application along with the electronic message, whereupon the service provider application utilizes the single-use token to verify that the electronic message has not been modified. The single-use token approach is burdensome on network resources as it requires additional communications between the client application and the common security subsystem each time an electric message is sent by the client application. Additionally, resources of the common security subsystem may be burdened, especially when a large number of client applications generate a large number of electronic messages that are to be sent to the service provider application.

In a common security subsystem signature approach, the common security subsystem signs each electronic message sent by the client application. The common security subsystem signature approach is also undesirable as it requires additional communications between the client application and the common security subsystem for each electronic message sent by the client application to the service provider application.

In a local signing authority (LSA) signature approach, an LSA installed on a client computing device executing the client application signs each electronic message with an electronic signature. The service provider application maintains a list of public keys for each client application that communicates with the service provider application. The service provider application utilizes the list to validate electronic signatures of the electronic messages sent by client applications. The LSA signature approach is undesirable as it requires the service provider application to maintain an active list of electronic signatures for each client application, which is computationally burdensome for the service provider application, especially when a large number of client applications send electronic messages to the service provider application.

SUMMARY

The following is a brief summary of subject matter that is described in greater detail herein. This summary is not intended to be limiting as to the scope of the claims.

Described herein are various technologies pertaining to tamper-proofing electronic messages. With more specificity, a computer-implemented technique for injecting a public key into a security token (e.g., an identity provider (IdP) token, an authorization provider (AuP) token) included in an electronic message is described herein. The public key injected in the security token provides a link between a payload of the electronic message that is signed using a private key (which forms a cryptographic key pair with the public key) and the security token.

In operation, a computing system comprises a client computing device, a first server computing device, and a second server computing device. The client computing device executes a client application and a local signing authority (LSA). Alternatively, the LSA may be executed by a dedicated server or service in a local network. The first server computing device executes a service provider application. The second server computing device executes a common security subsystem.

The client application transmits credentials for a user to the common security subsystem, whereupon the common security subsystem constructs an IdP token based upon the credentials responsive to validating the credentials. The common security subsystem transmits the IdP token to the client application. Responsive to receiving the IdP token, the client application transmits a request for an AuP token (with a provided scope) to the common security subsystem. The request includes the IdP token and an identifier for the client application. The request may also include metadata for the IdP token and/or the client application. The common security subsystem validates the request, constructs the AuP token based upon the request, and transmits the AuP token to the client application. The AuP token comprises a public key of the LSA that executes on the client computing device.

The client application constructs a payload responsive to receiving the AuP token from the common security subsystem. The payload includes an indication of a programmatic task that is to be performed by the service provider application (or another application). The client application causes the payload to be received by the LSA, whereupon the LSA signs the payload with a private key of the LSA. The private key and the public key form a cryptographic key pair. The LSA then causes the signed payload to be received by the client application.

Responsive to receiving the signed payload, the client application constructs an electronic message and transmits the electronic message to the service provider application. The electronic message comprises the AuP token (which includes the public key) and the signed payload. The service provider application validates the AuP token based upon security data that is accessible to the service provider application. The service provider application then extracts the public key from the AuP token and validates an electronic signature of the signed payload using the extracted public key. Responsive to validating the electronic signature, the service provider application executes the programmatic task. For instance, the service provider application may retrieve and transmit application data to the client application.

The above-described technologies present various advantages over conventional technologies pertaining to tamper-proofing electronic messages. First, unlike the single-use token approach and the common security subsystem signature approach, the above-described technologies do not require a common security subsystem to sign an electronic message generated by a client application. Thus, the above-described technologies reduce use of computational resources of the common security subsystem in addition to reducing burdens on network resources that are associated with the common security subsystem signing the electronic message. Second, unlike the LSA signature approach, the above-described technologies do not require the service provider application to maintain a potentially lengthy list of public keys associated with client applications. Thus, the above-described technologies also result in reduced use of computational resources of the service provider application. Third, the above-described technologies reduce configuration complexity of the computing system in comparison to conventional approaches. Additionally, the above-described technologies are well-suited for use in healthcare-related contexts.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to tamper-proofing electronic messages are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

As used herein, the term "programmatic task" refers to one or more computer-executable instructions that are executed by a processor of a computing device that cause the processor to perform one or more actions.

Figure 1:
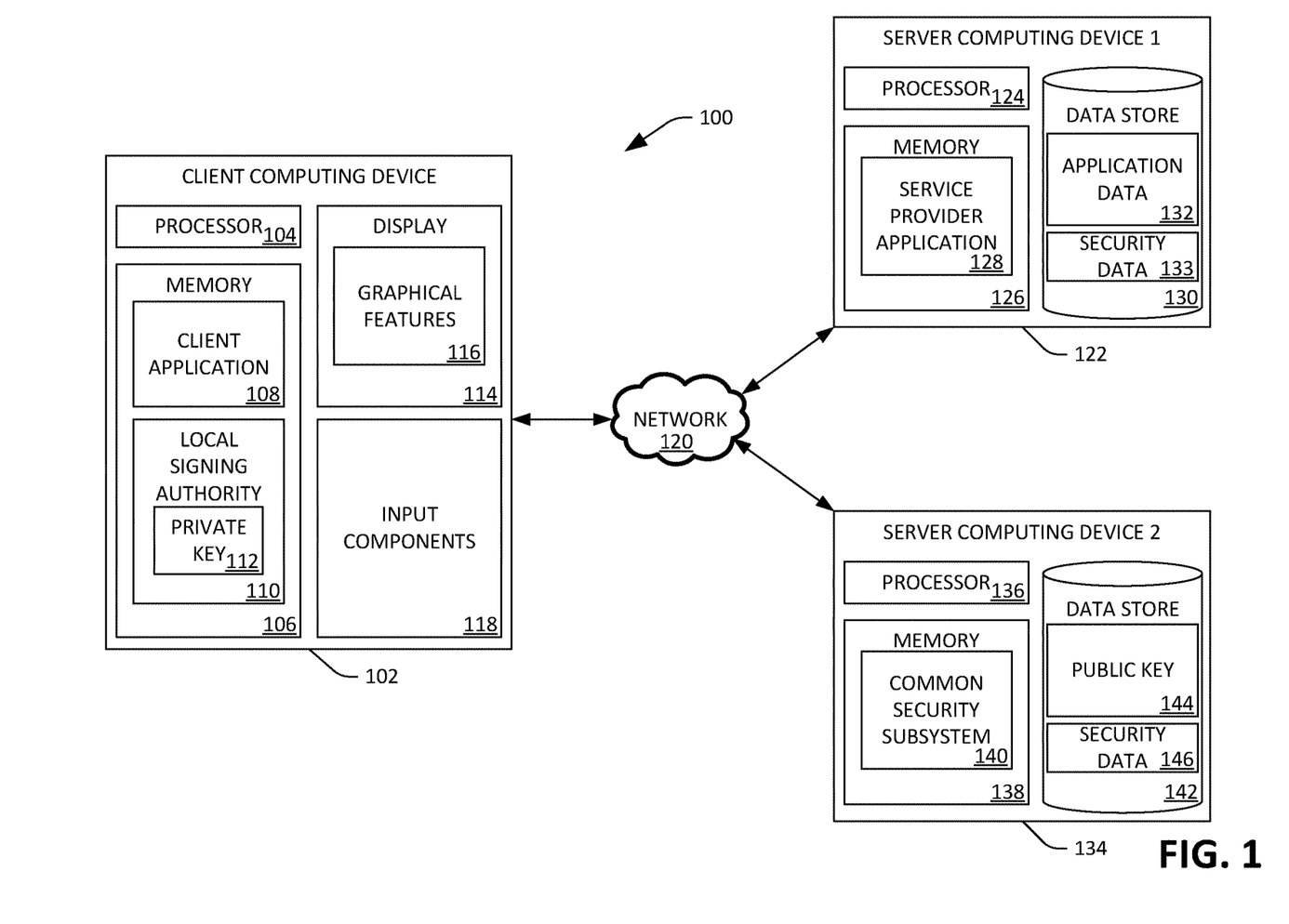
FIG. 1 is a functional block diagram of an exemplary computing system that facilitates tamper-proofing electronic messages.

With reference to FIG. 1, an exemplary computing system 100 that facilitates tamper-proofing electronic messages is illustrated. The computing system 100 includes a client computing device 102. In an example, the client computing device 102 may be a desktop computing device, a laptop computing device, a tablet computing device, a smartphone, a wearable computing device, etc. The client computing device 102 comprises a processor 104 and memory 106, wherein the memory 106 has a client application 108 and a local signing authority (LSA) 110 loaded therein. The client application 108 (when executed by the processor 104) is generally configured to communicate with a service provider application in order to provide for certain functionality to a user (not shown) of the client application 108. As will be described in greater detail below, the LSA 110 (when executed by the processor 104) is configured to electronically sign payloads included in electronic messages with a private key 112. The private key 112 is part of a cryptographic key pair with a public key 144. In an alternative embodiment, the LSA 110 may be executed by a dedicated server or service in a local network instead of the client computing device 102.

Although the private key 112 is depicted as being a part of the LSA 110, it is to be understood that the private key 112 may be separate from the LSA 110. Furthermore, although the private key 112 is depicted as being retained in the memory 106, it is to be understood that the private key 112 may be retained in another storage location on the client computing device 102 (e.g., a secure memory, a data store, etc.). Additionally, while the LSA 110 is depicted as executed by the client computing device 102, it is to be understood that the LSA 110 may be executed by another computing device.

The client computing device 102 may include a display 114, whereupon graphical features 116 may be presented thereon. For instance, a graphical user interface (GUI) may be presented as part of the graphical features 116. Additionally, the client computing device 102 may include input components 118 that enable the client computing device 102 to receive input from a user (not shown). For instance, the input components 118 may include a mouse, a keyboard, a trackpad, a scroll wheel, a touchscreen, a camera, a video camera, etc.

Although the computing system 100 is depicted as including a single client computing device, it is to be understood that the computing system 100 may include many client computing devices, each client computing device executing a respective client application and an LSA.

The computing system 100 further includes a first server computing device 122 that is in communication with the client computing device 102 by way of a network 120 (e.g., the Internet, intranet, etc.). The first server computing device 122 comprises a processor 124 and memory 126, wherein the memory 126 has a service provider application 128 loaded therein. As will be described in greater detail below, the service provider application 128 (when executed by the processor 124) is configured to validate electronic messages received from the client application 108 and to execute programmatic tasks responsive to validating the electronic messages. Thus, in an example, the service provider application 128 and the client application 108 may form a distributed application with server-side features (provided by the service provider application 128) and client-side features (provided by the client application 108). In another example, the service provider application 128 may be part of a federated identity management arrangement between a group of enterprises in which subscribers (i.e., users) may use the same credentials to obtain access to networks of all enterprises in the group of enterprises.

The first server computing device 122 may additionally include a data store 130. The data store 130 may include application data 132. The application data 132 is data that is managed by the service provider application 128. The service provider application 128 may execute programmatic tasks related to the application data 132. For instance, the service provider application 128 may cause the application data 132 (or a portion thereof) to be transmitted to the client application 108. The service provider application 128 is configured to trust security tokens (e.g., identity provider (IdP) tokens, an authorization provider (AuP) tokens) issued by a common security subsystem 140 (described below). As such, the data store 130 may additionally include security data 133 which is utilized by the service provider application 128 to validate the security tokens constructed by the common security subsystem 140.

The computing system 100 additionally includes a second server computing device 134 that is in communication with the client computing device 102 by way of the network 120. The second server computing device 134 may also be in communication with the first server computing device 122 by way of the network 120 (or another network). The second server computing device 134 comprises a processor 136 and memory 138, wherein the memory 138 has the common security subsystem 140 loaded therein (also referred to as a common IdP/AuP subsystem). As will be described in greater detail below, the common security subsystem 140 (when executed by the processor 136) is configured to generate security tokens (e.g., IdP tokens, AuP tokens, etc.) that facilitate the generation and consumption of electronic messages. Thus, the common security subsystem 140 provides both identification verification and authorization verification functionality. In an embodiment, the identification verification and authorization verification functionality may be performed by separate applications.

The second server computing device 134 additionally includes a data store 142. The data store 142 includes the public key 144 that forms the cryptographic key pair with the private key 112. As will be described in greater detail below, the common security subsystem 140 is configured to inject the public key 144 into a security token (e.g., an IdP token and/or an AuP token). Although the public key 144 is depicted as being retained in the data store 142, it is to be understood that the public key 144 may be retained in the memory 138 or a secure memory of the second server computing device 134.

The data store 142 also includes security data 146. The security data 446 enables the common security subsystem 140 to validate credentials for a user of the client application 108. The security data 146 also enables the common security subsystem 140 to validate a request for an AuP token with a provided scope (described in greater detail below) received from the client application 108.

Figure 2:
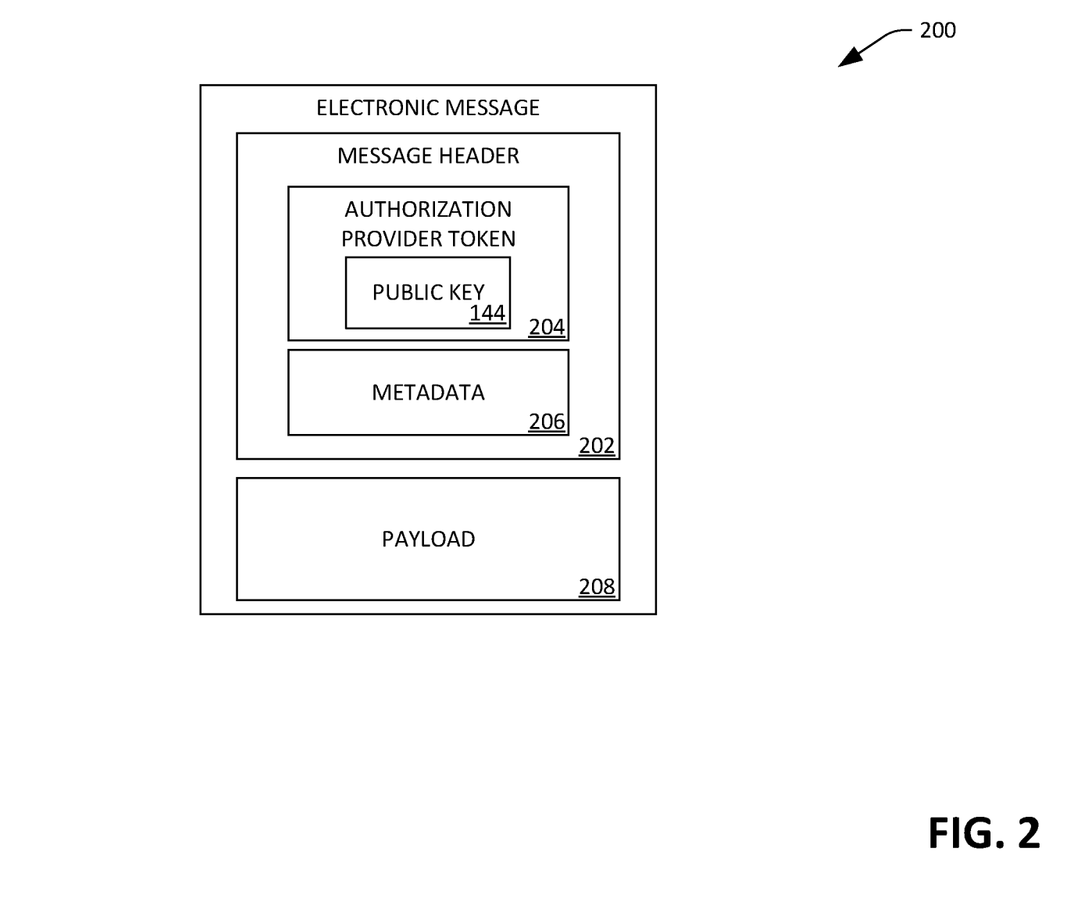
FIG. 2 is a functional block diagram of an exemplary electronic message.

Referring now to FIG. 2, an exemplary electronic message 200 is illustrated. The client application 108 constructs the electronic message 200 and transmits the electronic message 200 to the service provider application 128. The electronic message 200 comprises a message header 202. The message header 202 includes an AuP token 204 that is used in the computing system 100 to authorize a user of the client application 108 to cause the service provider application 128 to perform a programmatic task. The AuP token 204 has a validity time period during which the AuP token 204 is valid. For instance, the validity time period may be 5 to 60 minutes. More specifically, the validity time period may be 10 to 45 minutes, 15 to 30 minutes, or 20 to 25 minutes from a time that common security subsystem 140 generates the AuP token 204. The AuP token 204 includes the public key 144 that is injected into the AuP token 204 by the common security subsystem 140 (described in greater detail below). More specifically, the AuP token 204 may include a plurality of claims, and the public key 144 may be included in a claim in the plurality of claims. At least some of the plurality of claims may be included in an IdP token, and the at least some of the plurality of claims may be transferred to the AuP token 204 by the common security subsystem 140 when then AuP token 204 is constructed. The message header 202 additionally includes metadata 206 about the electronic message 200. For instance, the metadata 206 may include an identity of a user that generated the electronic message 200, a time of creation of the electronic message 200, an identifier for the client application 108, an identifier for the service provider application 128, a size of the electronic message 200, etc.

The electronic message 200 further includes a payload 208. In an embodiment, the payload 208 may be formatted in a JavaScript Object Notation (JSON) format. The payload 208 may be unsigned or the payload 208 may be signed by the LSA 110 using the private key 112. The payload 208 comprises data that is indicative of a programmatic task that is to be performed by the service provider application 128 (or another application), as well as data necessary for the service provider application 128 to perform the programmatic task.

Figure 3:
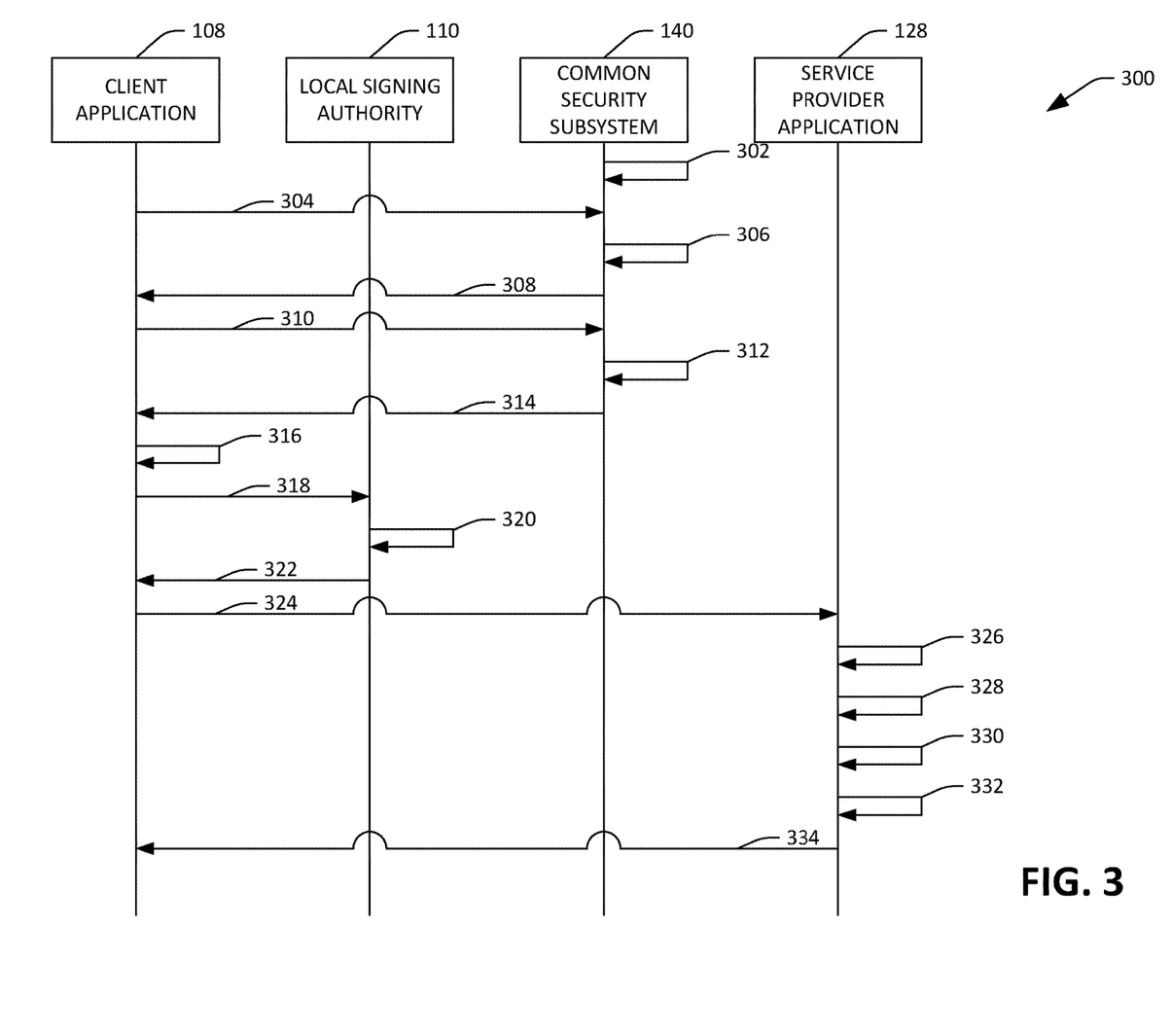
FIG. 3 illustrates a control flow diagram for tamper-proofing an electronic message.

Turning now to FIG. 3, a control flow diagram 300 that illustrates operation of the computing system 100 is illustrated. At step 302, the common security subsystem 140 (and the client application 108) are configured to accept the public key 144 as part of a security token (e.g., an IdP token or an AuP token). It is to be understood that step 302 is part of an enrollment process and as such need only be performed once.

The client application 108 receives credentials (e.g., a username and a password) for a user of the client application 108 by way of the input components 118. At step 304, the client application 108 transmits the credentials to the common security subsystem 140. In an embodiment, the client application 108 may transmit the public key 144 along with the credentials. The common security subsystem 140 receives the credentials, and at step 306, the common security subsystem 140 constructs an IdP token responsive to validating the credentials using the security data 146. The IdP token verifies that the user is who he/she asserts him/herself to be. The IdP token may comprise a plurality of claims. In an embodiment, the IdP token may be a security assertion markup language (SAML) token or a JSON Web Token (JWT). In an embodiment, the common security subsystem 140 may inject the public key 144 into the IdP token when constructing the IdP token such that the public key 144 is included in the claims of the IdP token. At step 308, the common security subsystem 140 transmits the IdP token to the client application 108.

The client application 108 receives the IdP token, and at step 310, the client application 108 transmits a request for an AuP token (with a provided scope) to the common security subsystem 140. The request includes the IdP token and an identifier for the client application 108. The request may also include metadata for the IdP token and/or the client application 108. The common security subsystem 140 receives the request, and at step 312, the common security subsystem 140 constructs the AuP token 204 based upon the request responsive to validating the request using the security data 146. The AuP token 204 verifies that the user is authorized to cause the service provider application 128 to perform a programmatic task. In an embodiment, the AuP token 204 may be a SAML token or a JWT. The AuP token 204 includes the public key 144. In an embodiment where the public key 144 is included in the IdP token, the common security subsystem 140 extracts the public key 144 from the IdP token and injects the public key 144 into the AuP token 204. More specifically, the common security subsystem 140 may transfer the plurality of claims from the IdP token into the AuP token 204 when constructing the AuP token 204. In an embodiment where the public key 144 is not included in the IdP token, the common security subsystem 140 injects the public key 144 into the AuP token 204. At step 314, the common security subsystem 140 transmits the AuP token 204 to the client application 108. The client application 108 receives the AuP token 204 and may cache the AuP token 204 in the memory 106 or another storage location, such as secure memory of the client computing device 102.

At step 316, the client application 108 constructs the payload 208. At step 318, the client application 108 causes the payload 208 to be received by the LSA 110. At step 320, the LSA 110 electronically signs the payload 208 (with an electronic signature) using the private key 112. At step 322, the LSA 110 causes the payload 208 (now referred to as the signed payload 208) to be received by the client application 108.

The client application 108 constructs the electronic message 200 based upon the AuP token 204 (which includes the public key 144) and the signed payload 208. At step 324, the client application 108 transmits the electronic message 200 to the service provider application 128. The service provider application 128 receives the electronic message 200, and at step 326, the service provider application 128 validates the AuP token 204. More specifically, the service provider application 128 validates the AuP token 204 based upon the security data 133 included in the data store 130. Additionally, the service provider application 128 determines that the AuP token 204 is valid by comparing the validity time period included in the electronic message 200 with a current time. If the service provider application 128 determines that the AuP token 204 is no longer valid, the service provider application 128 may transmit a second electronic message to the client application 108 indicating that the AuP token 204 has expired. At step 328, responsive to validating the AuP token 204, the service provider application 128 extracts the public key 144 from the AuP token 204. At step 330, the service provider application 128 validates an electronic signature of the signed payload 208 using the extracted public key 144, which is possible as the electronic signature has been previously signed using the private key 112 which forms a cryptographic key pair with the extracted public key 144.

At step 332, responsive to validating the electronic signature of the signed payload 208, the service provider application 128 executes processing in furtherance of the programmatic task indicated by the signed payload 208. In an example, the service provider application 128 may retrieve the application data 132 (or a portion thereof) from the data store 130. More specifically, the signed payload 208 may include an identifier for the application data 132 (or the portion thereof). The service provider application 128 may execute a search over the data store 130 based upon the identifier for the application data 132 (or the portion thereof). The service provider application 132 may then retrieve the application data 132 (or the portion thereof) from the data store 130 based upon search results for the search. In another example, the service provider application 128 may cause another application (not shown) executing on another computing device (not shown) to perform a second programmatic task.

At step 334, the service provider application 128 transmits the application data 132 (or the portion thereof) to the client application 108. In an example, the client application 108 may receive the application data 132 (or the portion thereof) and may present the application data 132 (or the portion thereof) as part of the graphical features 116 presented on the display 114. In another example where the service provider application 128 is part of a federated identity management arrangement, the application data 132 may enable the client computing device 102 to access networks of enterprises belonging to a group of enterprises.

As noted above, the client application 108 has cached the AuP token 204 in the memory 106 (or another storage location on the client computing device 102). In the event that the client application 108 needs to transmit a second electronic message to the service provider application 128 and the validity time period of the AuP token 204 has not yet expired, the client application 108 may retrieve the AuP token 204 from the memory 106 (or another storage location on the client computing device 102) and the client application 108 may construct the second electronic message using the AuP token 204. Thus, during the time validity period included in the AuP token 204, the client application 108 may bypass steps 302-314 when transmitting the second electronic message.

Figure 4:
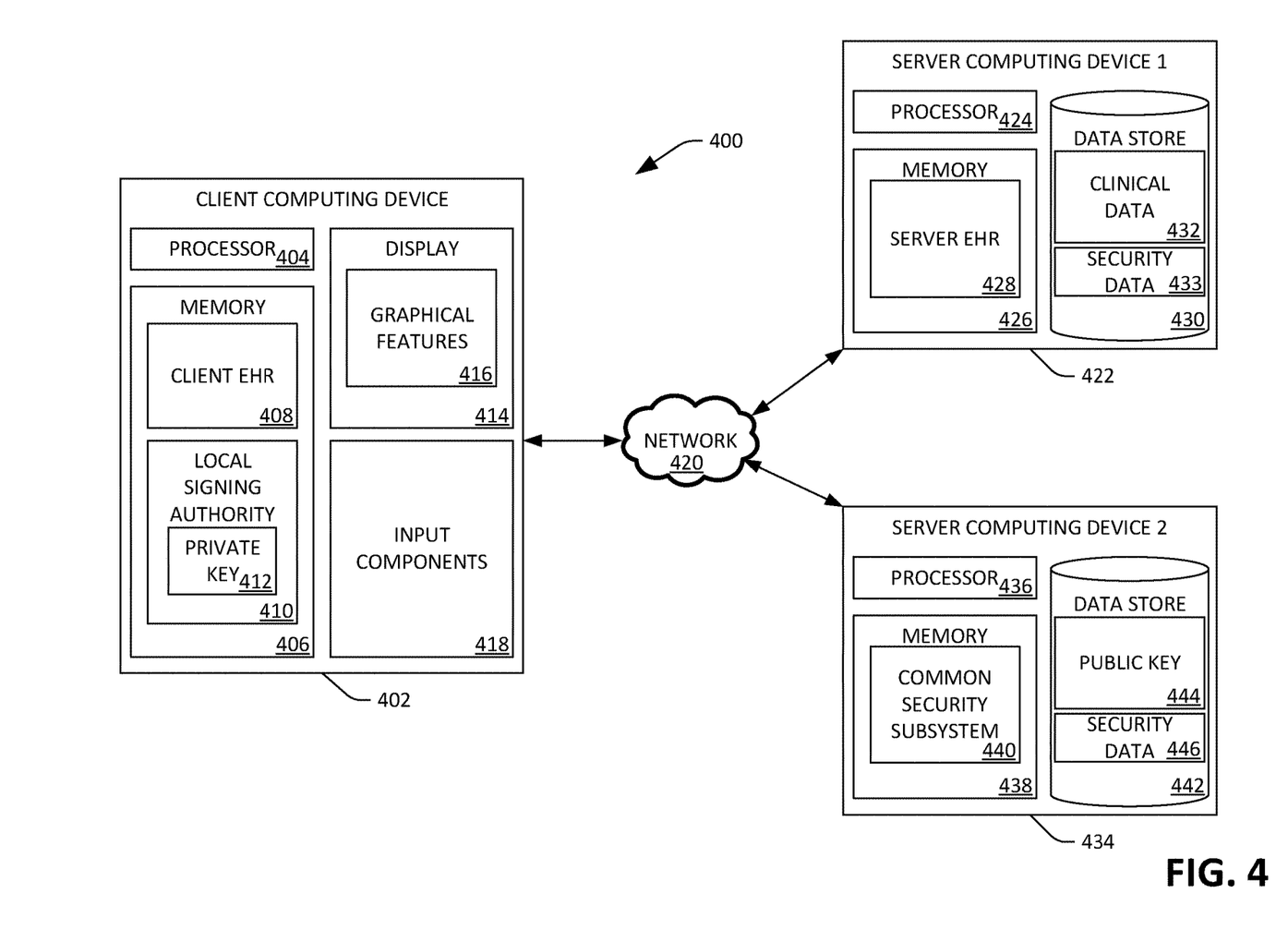
FIG. 4 is a functional block diagram of an exemplary computing system that facilitates tamper-proofing electronic messages in a healthcare context.

Referring now to FIG. 4, an exemplary computing system 400 that facilitates tamper-proofing electronic messages in a healthcare environment is illustrated. The computing system 400 includes a client computing device 402. In an example, the client computing device 402 may be a desktop computing device, a laptop computing device, a tablet computing device, a smartphone, a wearable computing device, etc. The client computing device 402 comprises a processor 404 and memory 406, wherein the memory 406 has a client electronic health records application (EHR) 408 and an LSA 410 loaded therein. The client EHR 408 (when executed by the processor 404) is generally configured to communicate with a server EHR in order to perform programmatic tasks related to patients in a healthcare facility. The LSA 410 and the private key 412 are similar or identical to the LSA 110 and the private key 112 described above in the description of FIG. 1. In an alternative embodiment, the LSA 410 may be executed by a dedicated server or service in a local network instead of the client computing device 402.

The client computing device 402 may include a display 414, whereupon graphical features 416 may be presented thereon. For instance, a graphical user interface (GUI) for the client EHR 408 may be presented as part of the graphical features 416. The client computing device 402 comprises input components 418 that are similar or identical to the input components 118 described above in the description of FIG. 1.

Although the computing system 100 is depicted as including a single client computing device executing a single client EHR, it is to be understood that the computing system 100 may include many client computing devices, each client computing device in the client computing devices executing a client EHR and an LSA.

The computing system 400 further includes a first server computing device 422 that is in communication with the client computing device 402 by way of a network 420 (e.g., the Internet, intranet, etc.). The first server computing device 422 comprises a processor 424 and memory 426, wherein the memory 426 has a server EHR 428 loaded therein. The server EHR 428 (when executed by the processor 424) is configured to perform a variety of programmatic tasks related to patient healthcare in a healthcare facility (e.g., patient intake, prescription generation, patient record creation and maintenance, etc.).

The first server computing device 422 may additionally include a data store 430. The data store 430 may include clinical data 432 for patients, wherein the clinical data 432 is maintained by the server EHR 428. The clinical data 432 may include electronic health records, prescription records, claims data, patient/disease registries, health surveys data, clinical trials data, etc. The data store 430 also includes security data 433 which is similar or identical to the security data 133 described above in the description of FIG. 1.

The computing system 400 additionally includes a second server computing device 434 that is in communication with the first server computing device 422 and the client computing device 402. The second server computing device 434 comprises a processor 436 and memory 438, wherein the memory 438 has a common security subsystem 440 loaded therein. The common security subsystem 440 operates in a manner similar or identical to the common security subsystem 140 described above in the description of FIG. 1. The second server computing device 434 comprises a data store 442 that includes a public key 444 and security data 446. The public key 444 and the security data 446 are similar or identical to the public key 144 and the security data 146 described above in the description of FIG. 1.

The computing system 400 operates in a manner similar or identical to the computing system 100 described above in the description of FIGS. 1-3, with the client EHR 408 taking the place of the client application 108, the server EHR 428 taking the place of the service provider application 128, and the clinical data 432 taking the place of the application data 132. However, in the computing system 400, the programmatic task facilitates a healthcare workflow (e.g., electronic prescription generation, laboratory order generation, modification of clinical data for patients, etc.). For instance, the programmatic task executed by the server EHR 428 may be retrieving clinical data for a patient from the clinical data 432 and transmitting the clinical data for the patient to the client EHR 408. Thus, responsive to validating the signed payload 208, the server EHR 428 may execute a search over the clinical data 432 based upon the identifier for the patient included in the signed payload 208. The server EHR 428 may retrieve the clinical data for the patient based upon search results of the search. The server EHR 428 may transmit the clinical data for the patient to the client EHR 408. The client EHR 408 may then present the clinical data for the patient on the display 414 as part of the graphical features 416. The client EHR 408 may then receive input by way of the input components 418 that results in a further healthcare related task being executed by the client EHR 408 and/or the server EHR 428.

Figure 5:
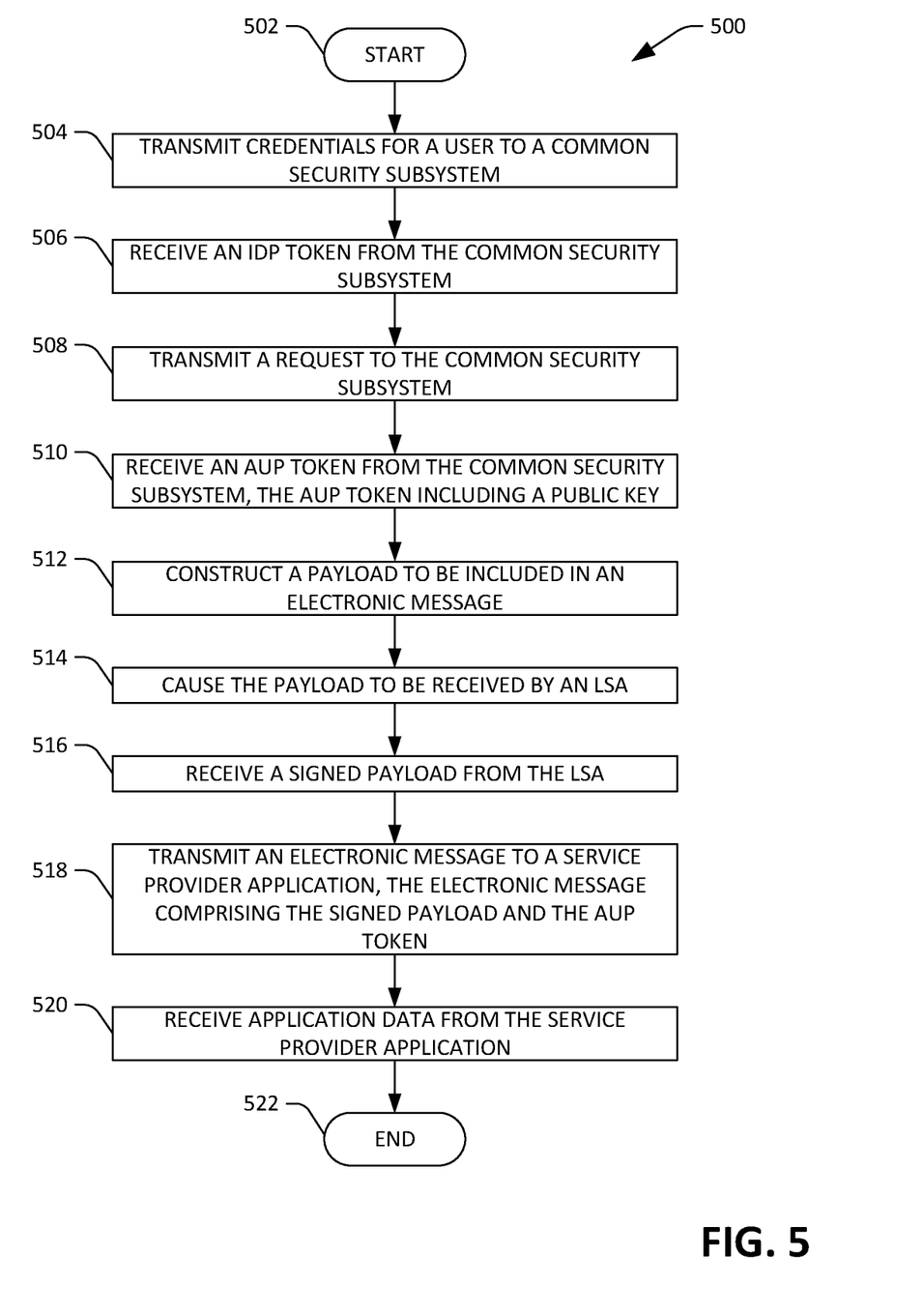
FIG. 5 is a flow diagram that illustrates an exemplary methodology executed by a client computing device for generating tamper-proof electronic messages.
Figure 6:
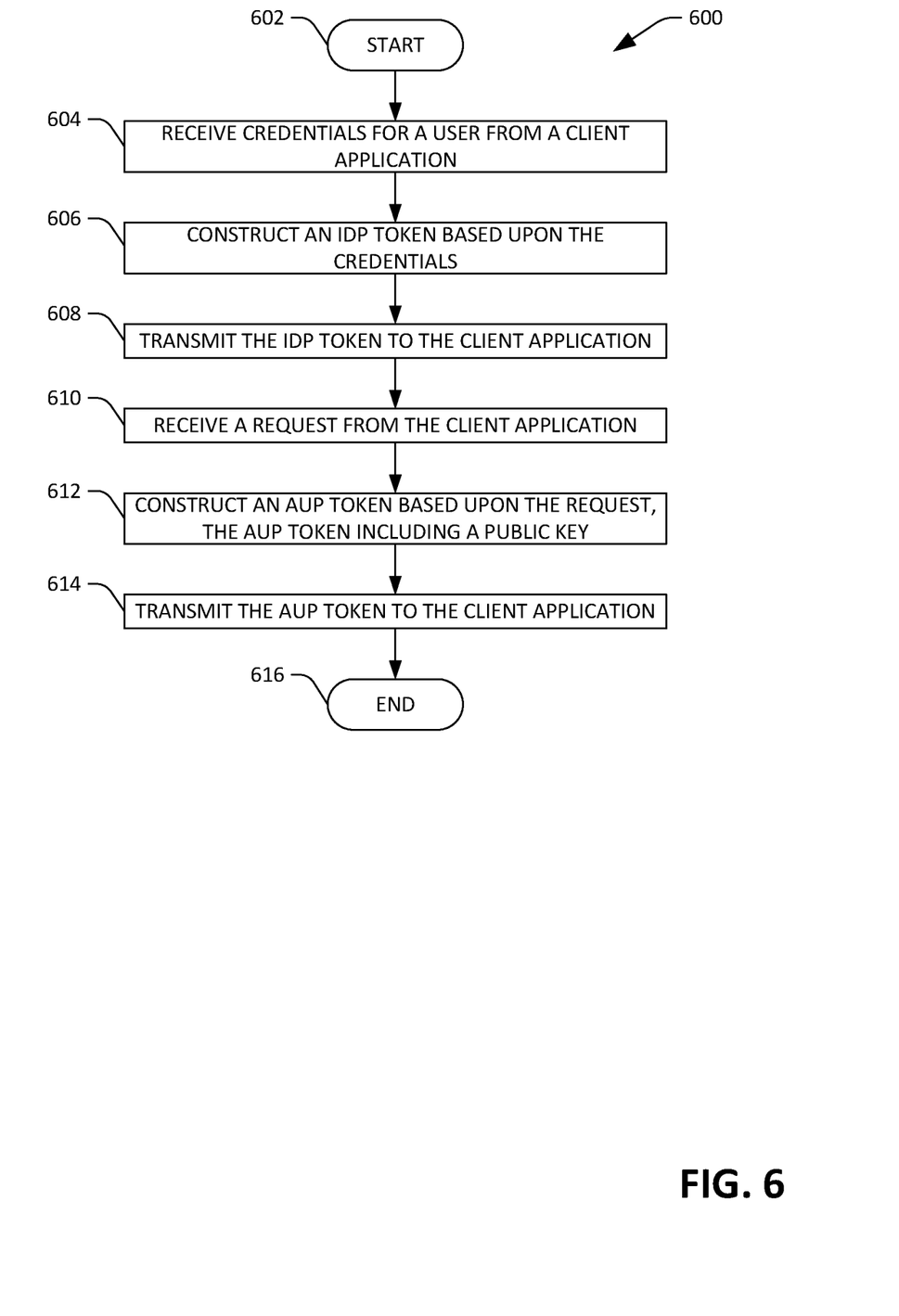
FIG. 6 is a flow diagram that illustrates an exemplary methodology executed by a common security subsystem that facilitates generating tamper-proof electronic messages.
Figure 7:
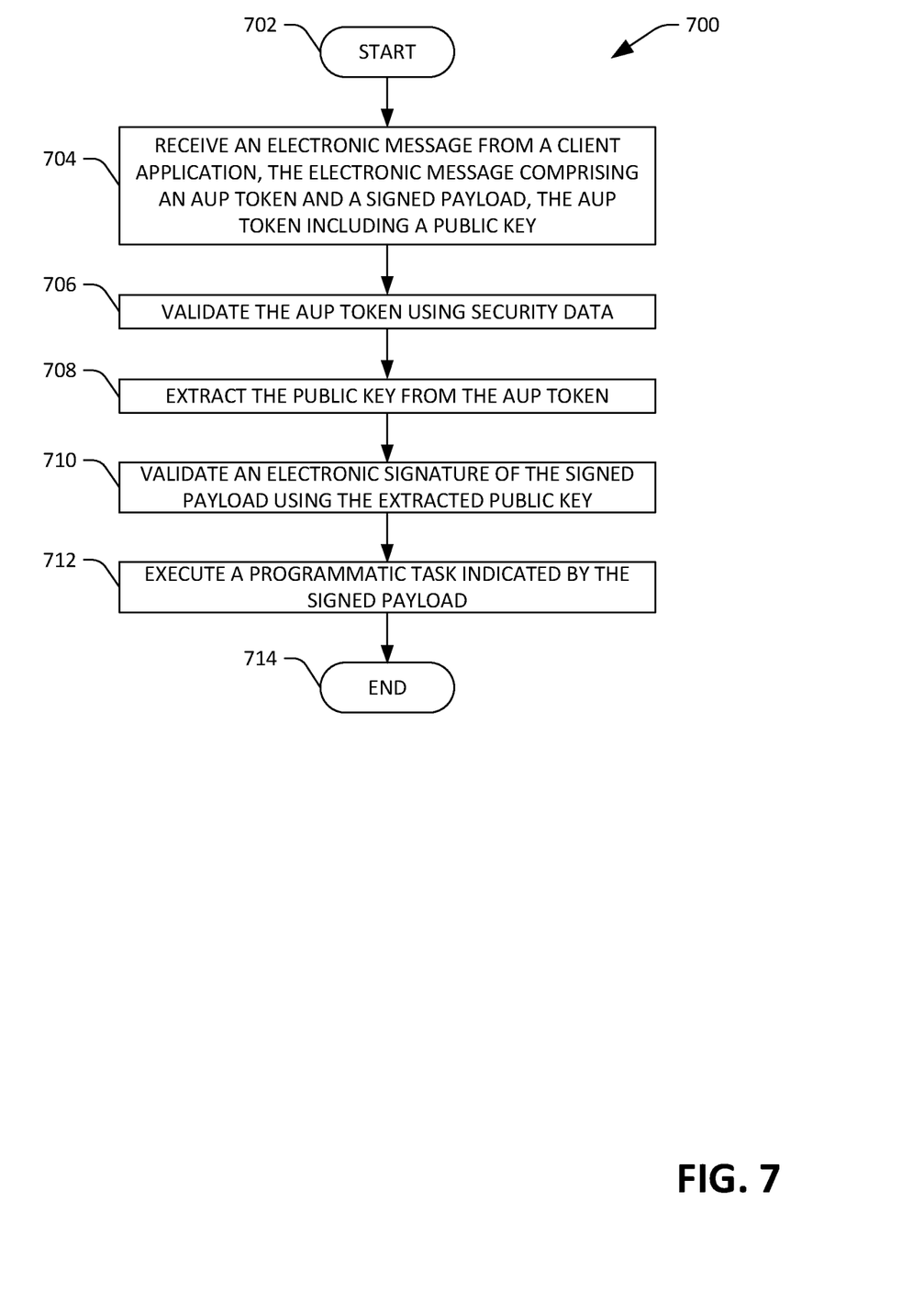
FIG. 7 is a flow diagram that illustrates an exemplary methodology executed by a service provider application for consuming tamper-proof electronic messages.

FIGS. 5-7 illustrate exemplary methodologies relating to tamper-proofing electronic messages. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 performed by a client computing device that facilitates generating a tamper-proof electronic message is illustrated. The methodology 500 begins at 502, and at 504 a client application executing on the client computing device transmits credentials for a user to a common security subsystem. At 506, the client application receives an IdP token from the common security subsystem. At 508, responsive to receiving the IdP token from the common security subsystem, the client application transmits a request for an AuP token with a provided scope to the common security subsystem. The request includes the IdP token and an identifier for the client application. The request may also include metadata for the IdP token and/or the client application. At 510, the client application receives the AuP token from the common security subsystem. The AuP token includes a public key of an LSA that is executing on the client computing device.

At 512, responsive to receiving the AuP token, the client application constructs a payload that is to be included in an electronic message. The payload includes an indication of a programmatic task that is to be performed by a service provider application. At 514, the client application causes the payload to be received by the LSA. At 516, the client application receives a signed payload from the LSA. At 518, responsive to receiving the signed payload and generating the electronic message, the client application transmits the electronic message to the service provider application. The electronic message comprises the signed payload and the AuP token (which includes the public key of the LSA). At 520, the client application receives application data from the service provider application. The methodology 500 concludes at 522.

Turning now to FIG. 6, a methodology 600 performed by a common security subsystem that facilitates generating a tamper-proof electronic message is illustrated. The methodology 600 begins at 602, and at 604 the common security subsystem receives credentials for a user from a client application. At 606, responsive to validating the credentials for the user based upon security data, the common security subsystem constructs an IdP token based upon the credentials. At 608, responsive to constructing the IdP token, the common security subsystem transmits the IdP token to the client application. At 610, the common security subsystem receives a request for an AuP token with a provided scope from the client application. The request includes the IdP token and an identifier for the client application. The request may also include metadata for the IdP token and/or the client application. At 612, responsive to validating the request based upon the security data, the common security subsystem constructs the AuP token based upon the request. The AuP token includes a public key of an LSA executing on a client computing device that executes the client application. At 614, responsive to constructing the AuP token, the common security subsystem transmits the AuP token to the client application. The methodology 600 concludes at 616.

With reference now to FIG. 7, a methodology 700 performed by a service provider application that facilitates validating a tamper-proof electronic message is illustrated. The methodology 700 begins at 702, and at 704 the service provider application receives an electronic message from a client application. The electronic message comprises an AuP token and a signed payload. The AuP token includes a public key of an LSA executing on the client computing device. The signed payload comprises an indication of a programmatic task that is to be performed by the service provider application. The signed payload has been signed by a private key of the LSA. At 706, responsive to receiving the AuP token, the service provider application validates the AuP token using security data that is accessible to the service provider application. At 708, responsive to validating the AuP token, the service provider application extracts the public key from the AuP token. At 710, responsive to extracting the public key from the AuP token, the service provider application validates an electronic signature of the signed payload using the extracted public key. At 712, responsive to validating the electronic signature of the signed payload, the service provider application executes the programmatic task. The methodology 700 concludes at 714.

Figure 8:
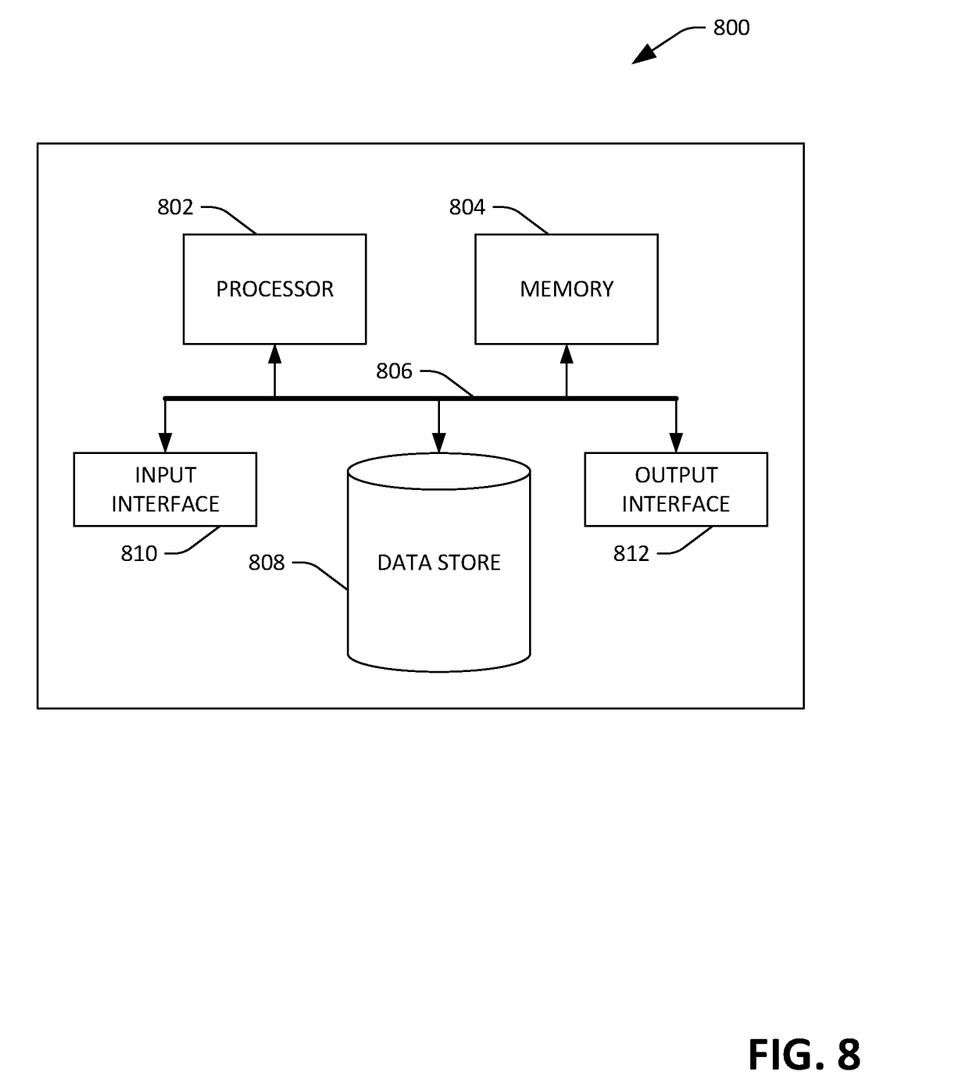
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that generates tamper-proof electronic messages. By way of another example, the computing device 800 can be used in a system that includes a public key of an LSA within an AuP token. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store application data, clinical data, IdP tokens, AuP tokens, public keys, private keys, electronic messages, security data, etc.

The computing device 800 additionally includes a data store 808 that is accessible by the processor 802 by way of the system bus 806. The data store 808 may include executable instructions, application data, clinical data, IdP tokens, AuP tokens, public keys, private keys, electronic messages, security data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device, comprising:
a processor; and
memory storing a service provider application that, when executed by the processor, causes the processor to perform acts comprising:
receiving an electronic message from a client application executing on a client computing device that is in network communication with the server computing device, the electronic message comprising:
an authorization provider (AuP) token, the AuP token including a public key of a local signing authority (LSA) executing on the client computing device; and
a signed payload that has been signed by the LSA using a private key of the LSA that forms a cryptographic key pair with the public key, the signed payload comprising an indication of a programmatic task that is to be executed by the service provider application;
responsive to validating the AuP token in the electronic message based upon security data accessible to the service provider application, extracting the public key from the electronic message;
validating the signed payload based upon the extracted public key of the LSA; and
responsive to validating the signed payload, executing the programmatic task.

2. The server computing device of claim 1, wherein executing the programmatic task comprises transmitting application data to the client application.

3. The server computing device of claim 1, wherein a common security subsystem is executing on a second server computing device that is in network communication with the client computing device, wherein the common security subsystem is configured to include the public key in an identity provider (IdP) token prior to the client application causing the electronic message to be received by the service provider application.

4. The server computing device of claim 3, wherein the client application transmits credentials for a user to the common security subsystem, wherein the common security subsystem constructs the IdP token responsive to validating the credentials, the IdP token including the public key of the LSA, wherein the common security subsystem transmits the IdP token to the client application responsive to constructing the IdP token.

5. The server computing device of claim 4, wherein the client application transmits a request for the AuP token with a provided scope to the common security subsystem responsive to receiving the IdP token, the request including the IdP token and an identifier for the client application, wherein the common security subsystem constructs the AuP token based upon the request, wherein the common security subsystem transmits the AuP token to the client application responsive to constructing the AuP token.

6. The server computing device of claim 5, wherein the client application constructs a payload responsive to receiving the AuP token from the common security subsystem, wherein the payload is an unsigned version of the signed payload.

7. The server computing device of claim 6, wherein the LSA signs the payload with the private key of the LSA responsive to receiving the payload from the client application, thereby causing the signed payload to be generated.

8. The server computing device of claim 7, wherein the client application generates the electronic message responsive to receiving the signed payload from the LSA, wherein the client application transmits the electronic message to the service provider application, thereby causing the service provider application to receive the electronic message.

9. The server computing device of claim 1, wherein the AuP token additionally includes a validity time period, wherein validating the AuP token in the electronic message additionally comprises determining that the AuP token has been received by the service provider application within the validity time period.

10. The server computing device of claim 1, wherein the client application causes the AuP token to be cached within a storage location on the client computing device responsive to the client application receiving the AuP token from the common security subsystem.

11. A method performed by a processor of a server computing device while the server computing device executes a service provider application, the method comprising:
    receiving an electronic message from a client application executing on a client computing device that is in network communication with the server computing device, the electronic message comprising:
        an authorization provider (AuP) token, the AuP token including a public key of a local signing authority (LSA) executing on the client computing device; and
        a signed payload that has been signed by the LSA using a private key of the LSA that forms a cryptographic key pair with the public key, the signed payload comprising an indication of a programmatic task that is to be executed by the service provider application;
    responsive to validating the AuP token in the electronic message based upon security data that is accessible to the service provider application, extracting the public key from the electronic message; and
    responsive to validating the signed payload based upon the extracted public key of the LSA, executing the programmatic task.

12. The method of claim 11, wherein a common security subsystem is executing on a second server computing device that is in network communication with the client computing device, wherein the common security subsystem is configured to include the public key of the LSA in the AuP token prior to the client application causing the electronic message to be received by the service provider application.

13. The method of claim 12, wherein the client application transmits credentials for a user to the common security subsystem, wherein the common security subsystem constructs the IdP token responsive to validating the credentials, wherein the common security subsystem transmits the IdP token to the client application responsive to constructing the IdP token.

14. The method of claim 13, wherein the client application transmits a request for the AuP token with a provided scope to the common security subsystem responsive to receiving the IdP token, the request including an identifier for the client application and the IdP token, wherein the common security subsystem constructs the AuP token based upon the request, wherein the common security subsystem injects the public key of the LSA into the AuP token, wherein the common security subsystem transmits the AuP token to the client application responsive to constructing the AuP token.

15. The method of claim 14, wherein the client application constructs a payload responsive to receiving the AuP token from the common security subsystem, wherein the payload is an unsigned version of the signed payload.

16. The method of claim 15, wherein the LSA signs the payload with the private key of the LSA responsive to receiving the payload from the client application, thereby causing the signed payload to be generated.

17. The method of claim 16, wherein the client application generates the electronic message responsive to receiving the signed payload from the LSA, wherein the client application transmits the electronic message to the service provider application, thereby causing the service provider application to receive the electronic message.

18. A computer-readable storage medium comprising a service provider application that, when executed by a processor of a server computing device, causes the processor to perform acts comprising:
    receiving an electronic message from a client application executing on a client computing device that is in network communication with the server computing device, the electronic message comprising:
        an authorization provider (AuP) token, the AuP token including a public key of a local signing authority (LSA) executing on the client computing device; and
        a signed payload that has been signed by the LSA using a private key of the LSA that forms a cryptographic key pair with the public key, the signed payload comprising an identifier for application data that is to be transmitted to the client application by the service provider application;
    responsive to validating the AuP token in the electronic message, extracting the public key from the electronic message;
    validating the signed payload based upon the extracted public key of the LSA; and
    subsequent to validating the signed payload, transmitting the application data to the client application.

19. The computer-readable storage medium of claim 18, wherein the service provider application is a server electronic health records application (EHR), wherein the client application is a client EHR operated by a healthcare worker, wherein the application data is clinical data for a patient, wherein the identifier for the application data is an identifier for the patient.

20. The computer-readable storage medium of claim 19, the acts further comprising:
    responsive to validating the signed payload, executing a search over clinical data for a plurality of patients, the search being based upon the identifier for the patient; and
    retrieving the clinical data for the patient based upon search results for the search.

* * * * *